United States Patent [19]
Kafka et al.

[11] Patent Number: 5,185,750
[45] Date of Patent: Feb. 9, 1993

[54] DISPERSION COMPENSATION FOR ULTRASHORT PULSE GENERATION IN TUNEABLE LASERS

[75] Inventors: James D. Kafka; Thomas M. Baer, both of Mountain View; Mark S. Keirstead, San Jose; Michael L. Watts, Union City; Horst W. Schaaf, Santa Clara, all of Calif.

[73] Assignee: Spectra-Physics Lasers Incorporated, Mountain View, Calif.

[21] Appl. No.: 717,367

[22] Filed: Jun. 19, 1991

Related U.S. Application Data

[60] Division of Ser. No. 697,692, May 9, 1991, which is a continuation-in-part of Ser. No. 518,535, May 2, 1990, abandoned.

[51] Int. Cl.⁵ ............................... H01S 3/098
[52] U.S. Cl. ......................... 372/18; 372/20; 372/98; 372/107; 372/33; 372/94
[58] Field of Search ............ 373/102, 18; 372/25, 372/20, 98, 107, 33, 94

[56] References Cited

U.S. PATENT DOCUMENTS

| | | | |
|---|---|---|---|
| 3,581,128 | 5/1971 | Smith | 331/94.5 |
| 3,675,154 | 7/1972 | Duguay et al. | 372/102 |
| 3,679,313 | 7/1972 | Rosenberg | 372/25 |
| 3,696,310 | 10/1972 | Paoli et al. | 372/102 |
| 4,928,282 | 5/1990 | Barthelemy et al. | 372/18 |

Primary Examiner—Léon Scott, Jr.
Attorney, Agent, or Firm—Kenneth D'Alessandro

[57] ABSTRACT

A mode locked pulsed laser incorporates an intracavity element to compensate for the dispersion caused by other intracavity elements. This element reduces the tendency of the pulse to broaden in the cavity due to group velocity dispersion and results in very short pulses. In the laser of the present invention, mode locking is initiated by detecting the beat frequency between adjacent longitudinal modes using a high speed photodiode. This signal is amplified and then the frequency is divided by two. The signal is passed through an electronically adjustable phase shifter and then to a power amplifier. This signal is applied to the acousto-optic modelocker. If the cavity length drifts the beat frequency between the longitudinal modes changes. The rf signal applied to the modulator changes in exactly the right manner to track the drift in cavity length. Thus the modelocker is automatically synched to the round trip of the laser cavity.

6 Claims, 6 Drawing Sheets

DISPERSION COMPENSATION FOR ULTRASHORT PULSE GENERATION IN TUNEABLE LASERS

RELATED APPLICATIONS

The present application is a divisional application of co-pending application Ser. No. 07/697,692, filed May 9, 1991, which is a continuation-in-part of application Ser. No. 07/518,535, filed May 2, 1990 now abandoned.

BACKGROUND OF THE INVENTION

1. Field of the Invention

The present invention relates to laser technology. More particularly, the present invention relates to mode locked lasers.

2. The Prior Art

Pulsed lasers for generation of short laser pulses are useful in a variety of applications. Active modelocking has been employed in lasers to achieve pulses having durations of around typically 30 to 50 psec in these systems. Shorter pulses have been observed but pulse trains have amplitude noise and/or phase noise. Other techniques have been developed to generate short pulses, including additive pulse modelocking and use of saturable absorbers. These techniques are complicated and are low average power systems.

An object of the present invention is to obtain ultrashort pulses at high average power from a laser.

BRIEF DESCRIPTION OF THE INVENTION

In a first aspect of the present invention, an actively mode locked pulsed laser incorporates an intracavity Gires Tournois interferometer to compensate for the group velocity dispersion caused by other intracavity elements. This interferometer reduces the tendency of the pulse to broaden in the cavity due to group velocity dispersion and results in very short pulses.

In a presently preferred embodiment, the laser employs a folded astigmatically compensated design with Ti:Sapphire as the gain medium, pumped by an argon ion laser. Modelocking is initiated in the laser using a standard acousto-optic modelocker. The laser is tuned using an intracavity birefringent filter. These elements restrict the lasing bandwidth and allow tuning from 660 nm to 1100 nm. A Gires-Tournois interferometer (GTI) is placed in the cavity to compensate for the group velocity dispersion caused by intracavity elements, including the birefringent filter. This interferometer has the advantage that it is a very low loss element that does not significantly reduce the output power level of the laser. Thus high average power outputs are possible.

The GTI consists of a flat high reflector and a partial reflector aligned in parallel relationship to form an etalon. This assembly is then used as an end mirror. The spacing of the mirrors in the interferometer and the reflectivity of the partial reflector are chosen to provide the appropriate dispersion compensation for the type of birefringent filter and other intracavity elements which are used in the tunable laser.

GTI's have been previously used for dispersion compensation outside of a laser cavity where the air space is set to a fixed value. Non-tunable lasers (such as CPM lasers) have employed GTI's with fixed spacing. The angle of the GTI is then set to a fixed value for the particular laser.

It has been discovered by the inventors that a variable spaced GTI may be usefully employed in the cavity of a tuneable laser. As the laser wavelength is tuned, the spacing of the GTI elements is adjusted by use of the piezo-electric crystal to compensate for the dispersion caused by the intracavity elements without affecting the alignment of the laser.

The mirrors in the GTI are mounted on a piezoelectric crystal which allows the spacing between the mirrors to be adjusted with an applied voltage. This fine adjustment of the spacing allows the GTI to be tuned to the proper wavelength to cancel the dispersion of the birefringent filter.

To tune the laser the birefringent filter is first adjusted to tune the laser to the appropriate color. A voltage is applied to the piezoelectric crystal in the GTI to adjust its spacing to provide the shortest pulses.

In a second aspect of the present invention, the mode locked laser of the present invention is mode locked by detecting the beat frequency between adjacent longitudinal modes using a high speed photodiode. This signal is amplified and then the frequency is divided by two. The signal is passed through an electronically adjustable phase shifter and then to a power amplifier. This signal is applied to the acousto-optic modelocker. If the cavity length drifts the beat frequency between the longitudinal modes changes. The rf signal applied to the modulator changes in exactly the right manner to track the drift in cavity length. Thus the modelocker is automatically synched to the round trip of the laser cavity.

DETAILED DESCRIPTION OF A PREFERRED EMBODIMENT

Those of ordinary skill in the art will realize that the following description of the present invention is illustrative only and not in any way limiting. Other embodiments of the invention will readily suggest themselves to such skilled persons.

In a first aspect of the present invention, an actively mode locked tuneable pulsed laser incorporates an intracavity Gires Tournois interferometer to compensate for the dispersion caused by other intracavity elements. This etalon reduces the tendency of the pulse to broaden in the cavity due to group velocity dispersion and results in very short pulses.

Figure 1:
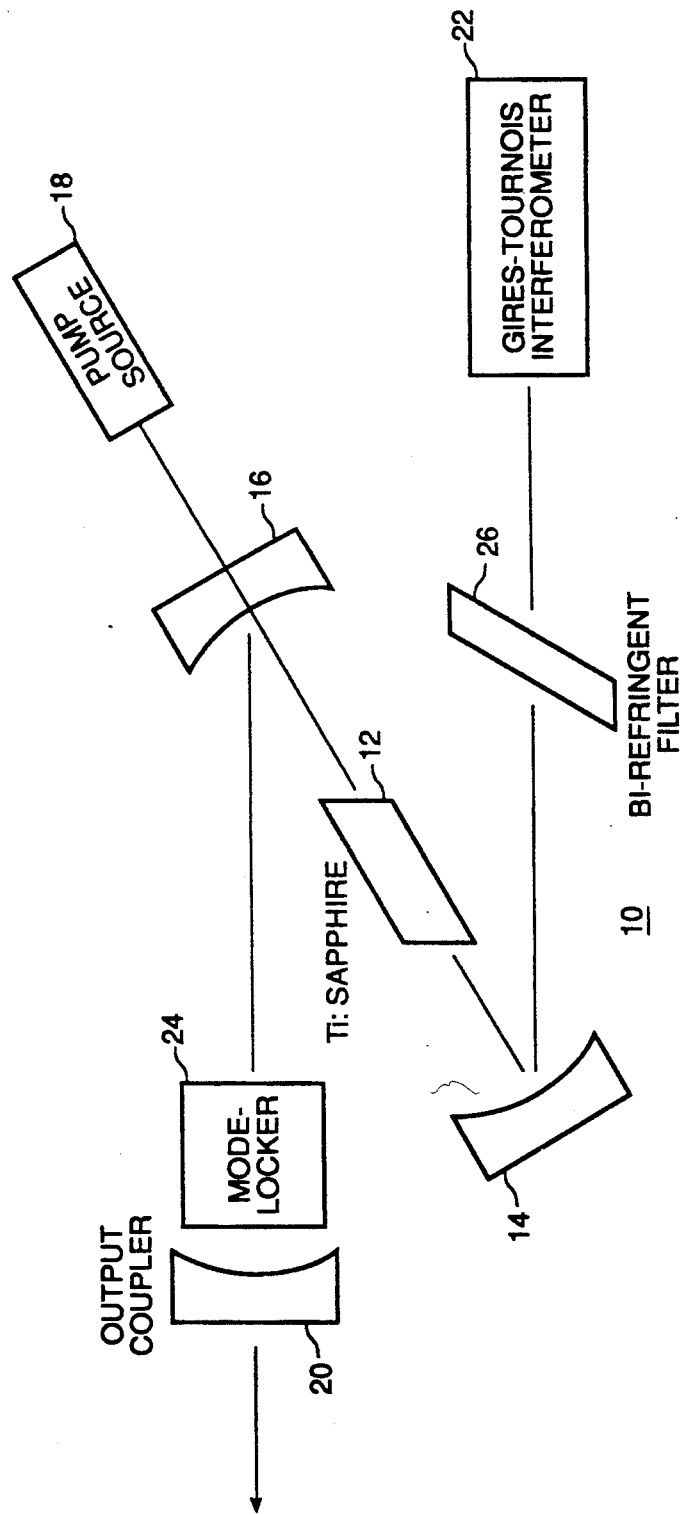
FIG. 1 is a diagram showing the elements of a preferred embodiment of a laser according to the present invention and their structural relationship to one another.

Referring first to FIG. 1, a presently preferred embodiment, a laser system 10 according to the present invention includes a Ti:Sapphire gain medium 12, which may be the same Ti:Sapphire gain medium as that used in the Model 3900 laser available from Spectra Physics, Inc., of Mountainview, Calif. In the embodiment of FIG. 1, a folded astigmatically compensated cavity design is employed using curved mirrors 14 and 16, such as curved mirrors part no. G0079-012, available from Spectra Physics Optics Corporation of Mountainview, Calif.

The gain medium 12 may be pumped by a suitable pump source, such as an all-lines argon ion laser 18, is focussed (not shown) and coupled into the cavity through curved mirror 16 as is known in the art. A first end of the cavity of laser 12 is defined by output coupler 20, which may be fabricated on a substrate part no. G0058 made by Spectra Physics Optics Corp., coated to a reflectivity of about 85%. The second end of the laser cavity is defined by GTI 22. In a presently preferred embodiment, GTI 22 may be a model 410, available from Spectra Physics Optics Modelocking of the laser 10 of the present invention is initiated using a standard acousto-optic modelocker 24. In a presently preferred embodiment, mode locker 24 may be one similar to the mode locker used in the Spectra Physics Model 3800 solid state laser, available from Newport Electro Optic Systems of Melbourne, Fla., but having an AR coating suitable for the desired wavelength. It has been discovered that once modelocking has been initiated by the active mode locker, the drive signal can be turned off and the laser will remain mode locked for several hours. Modelocking will not occur, however, if the laser is first turned on without the mode locker being connected. Thus, the acousto-optic modulator is an active means for initiating modelocking.

The laser 10 may be tuned using an intracavity birefringent filter 26. Single or multi plate birefringent filters are available from Spectra Physics, part no. 0434-8931, or from Virgo Optics of Port Richey, Fla. As will be appreciated by those of ordinary skill in the art, such a filter restricts the lasing bandwidth and allow tuning from 660 nm to 1100 nm.

Although the birefringent filter 26 is necessary for tuning, it also broadens the pulses in the laser by introducing group velocity dispersion. In addition, the Ti:Sapphire rod, the mode locker and the glass in the GTI also introduce group velocity dispersion. Different colors travel at different velocities through these elements. The pulse, which is composed of a spectrum of colors, is broadened by this group velocity dispersion after passage through these elements.

It has been heretofore assumed that the birefringent filter tuning element limited the bandwidth of the laser which in turn prevented the pulses from becoming short. However, broad band operation is possible using a one plate birefringent filter, but does not yield short pulses. The present inventors have discovered that the reason that tunable lasers produce broad pulses is because of the dispersion of the intracavity elements including the tuning element. Thus, adding the GTI (Gires-Tournois Interferometer) can compensate for dispersion introduced by these elements and can lead to a dramatic pulse shortening.

According to a presently preferred embodiment of the invention, the GTI is placed in the cavity to compensate for the group velocity dispersion caused by intracavity elements. This interferometer has the advantage that it is a very low loss element that does not significantly reduce the output power level of the laser. Thus high average power outputs are possible.

One other advantage of this technique is that transform-limited pulses are generated. That is, the bandwidth of the pulses is the minimum necessary to produce the pulse width observed and no additional frequencies are generated. This is desirable, both for use in spectroscopic experiments and for pulse compression which can produce still shorter pulse widths.

Figure 2A:
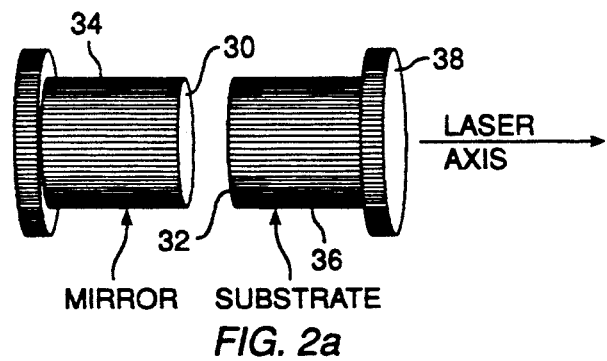
FIGS. 2a-2c are more detailed diagrams of a presently preferred construction of a GTI etalon used in the present invention.
Figure 2B:
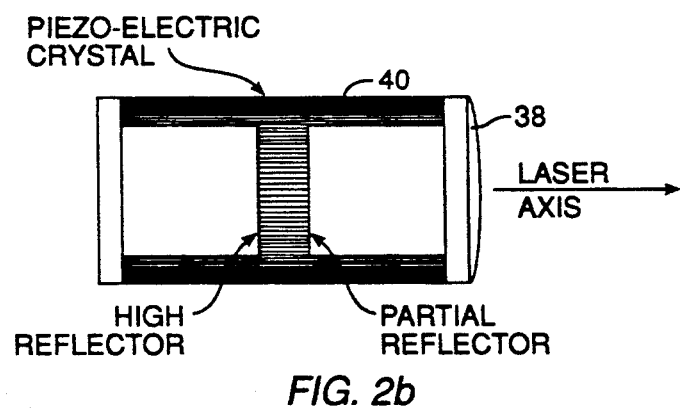
Figure 2C:
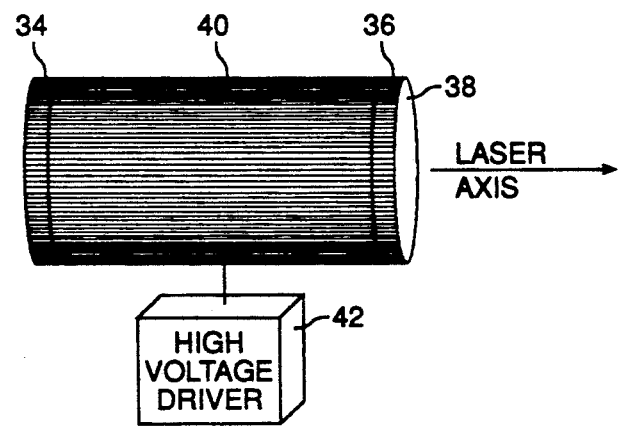

Referring now to FIG. 2a, a GTI 22 suitable for use in the present invention is seen to include a flat high reflective surface 30 and a partially reflective surface 32 aligned in parallel relationship to one another, to form an etalon. In the embodiment of FIG. 2a, surfaces 30 and 32 are disposed on mirror substrates 34 and 36, respectively. The other end of mirror substrate 36 is provided with an anti-reflective coating 38. As shown diagrammatically in cross section in FIG. 2b, this assembly is mounted on a piezoelectric crystal 40 which allows the spacing between the mirrors to be adjusted with an applied voltage supplied by high voltage driver 42. High voltage driver 42 may be a Model 476 interferometer driver available from Spectra Physics Inc., of Mountainview Calif. This fine adjustment of the spacing allows the GTI to be tuned to the proper wavelength to cancel the dispersion of the intracavity elements.

An air-spaced GTI was used to pulse compress a HeNe laser which operated at a fixed wavelength. The spacing wa set to give the shortest pulses and then never adjusted. M. A. Duguay and J. W. Hansen, *Compression of Pulses From a Mode Locked He-Ne Laser, Appl. Phy. Let.* Vol. 14, No. 1, p. 14 1969. Solid GTI's have previously been used in a CPM laser to compensate for dispersion. Since these lasers are not tuneable, the GTI is employed at an angle to optimize the dispersion, the laser is realigned and the GTI is never adjusted. J. Heppner and J. Kuhl, *Intracavity Chirp Compensation in a Colliding Pulse Mode Locked Laser Using Thin Film Interferometers, Appl. Phy. Let.* Vol. 47, No. 5, p. 453 1985. In a tuneable laser, the GTI must be readjusted for wavelength changes as small as one nanometer.

The use of a variable space GTI in the cavity of a tuneable laser according to the present invention allows the dispersion to be optimized at each wavelength without altering the angle of the GTI and thus misaligning the laser. The improvement of the present invention is useful in any tuneable modelocked laser regardless of the modelocking means used.

The spacing of the surfaces 30 and 32 and the interferometer and the reflectivity of surface 32 are chosen to provide the appropriate group velocity dispersion compensation for the intracavity elements used in the tunable laser. It has been found that an uncoated mirror supplying a reflection of 4% and a spacing of 80 microns compensates a standard single or double plate birefringent filter, a 2 cm Ti:sapphire rod, 2 cm of glass in the mode locker and 1 cm of glass in the GTI.

Figure 2D:
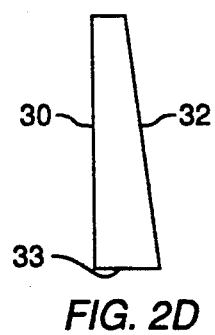
FIG. 2d is a diagram of an alternative embodiment of a GTI etalon according to the present invention.

Referring to FIG. 2d, an alternate embodiment of a GTI etalon useful in the present invention comprises a substrate 33 having opposed surfaces 30 and 32. Surface 30 is a high reflective surface and surface 32 is a partially reflective surface. In a typical embodiment, substrate 33 may be fabricated from fused silica, and may have a diameter of about 2.5 cm. A typical thickness for the substrate is about 50-100 microns, tapered by about 2 microns over its diameter such that faces 30 and 32 are not exactly parallel. Within a single beam diameter, however, this structure appears to have parallel faces and is tuneable by moving it along an axis normal to the beam path. Of course, a wedged air gap of similar dimensions may also be used.

If the beam is reflected from the GTI several times during one cavity round trip, the thickness of the spacer layer can be decreased. For thicknesses of less than 10 microns, the spacer can also be a dielectric coating applied directly to the high reflector when the mirror is fabricated. This dielectric spacer may also be wedged by known techniques such that translating the substrate will vary the thickness of the portion of the spacer traversed by the laser beam. To tune the laser the birefringent filter is first adjusted as known by those of ordinary skill in the art to tune the laser to the appropriate color. A voltage is applied to the piezoelectric crystal in the GTI to adjust its spacing or the wedged GTI is translated to provide the shortest pulses.

Those of ordinary skill in the art will recognize that other means of dispersion compensation or tuning are possible in tuneable lasers that have a small insertion loss and which thus can produce high average power. In particular, a pair of prisms can be used for dispersion compensation. This prism pair comprises two Brewster prisms placed in the cavity at Brewster's angle and arranged so that the second prism cancels the spread of the spectral components from the first prism.

Figure 3A:
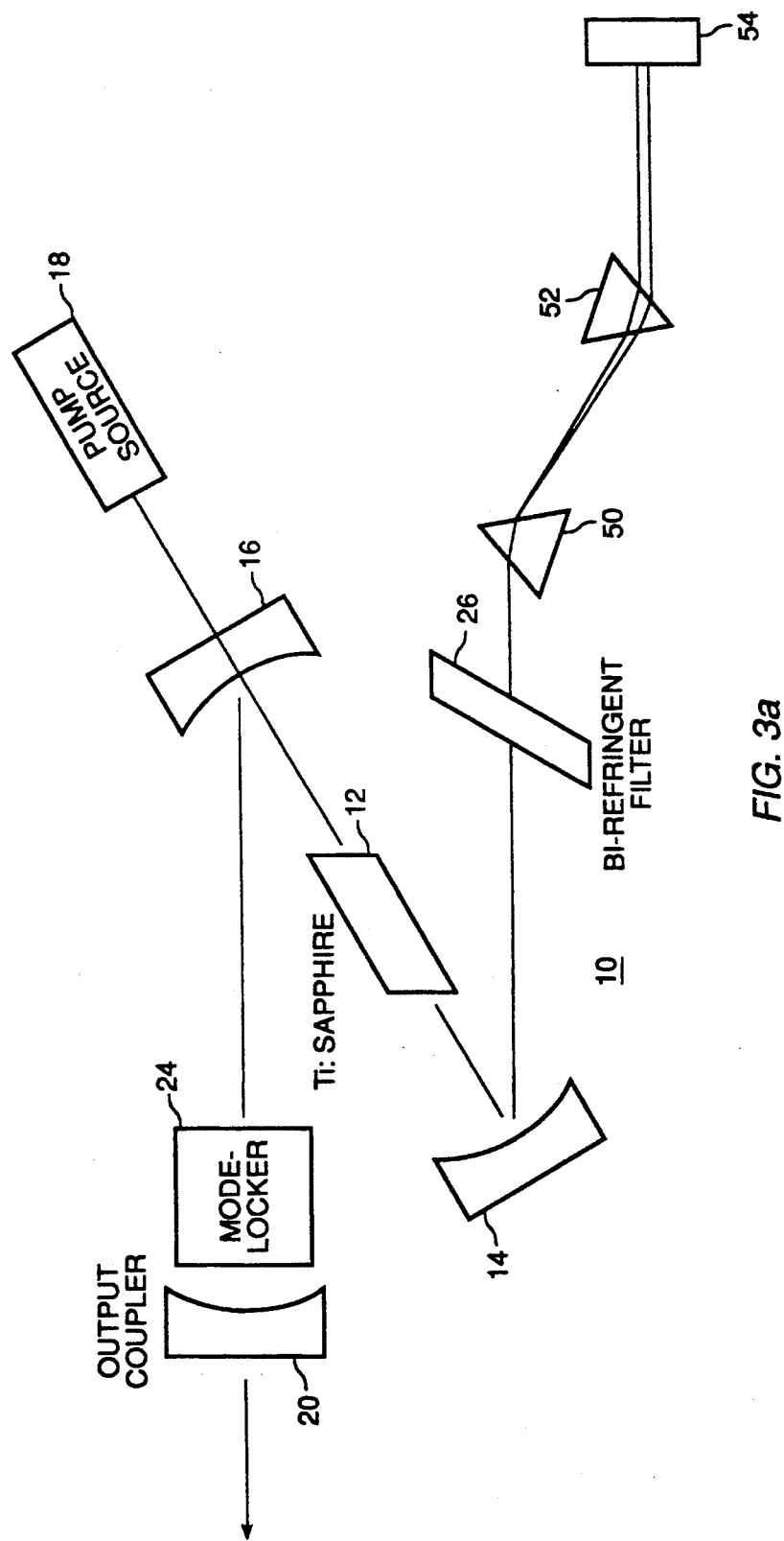
FIG. 3a is a diagram showing the elements of a first alternate embodiment of a laser according to the present invention and their structural relationship to one another.

If a prism pair is used to compensate the dispersion, several different tuning elements are possible. A birefringent filter may still be used. Such an embodiment is shown in FIG. 3a, where a prism pair including first and second prisms 50 and 52 are placed in the beam path along with birefringent filter 26. A flat end mirror 54 defines the end of the laser cavity. The spectral components of the laser beam are shown dispersed in the plane of the figure.

Figure 3B:
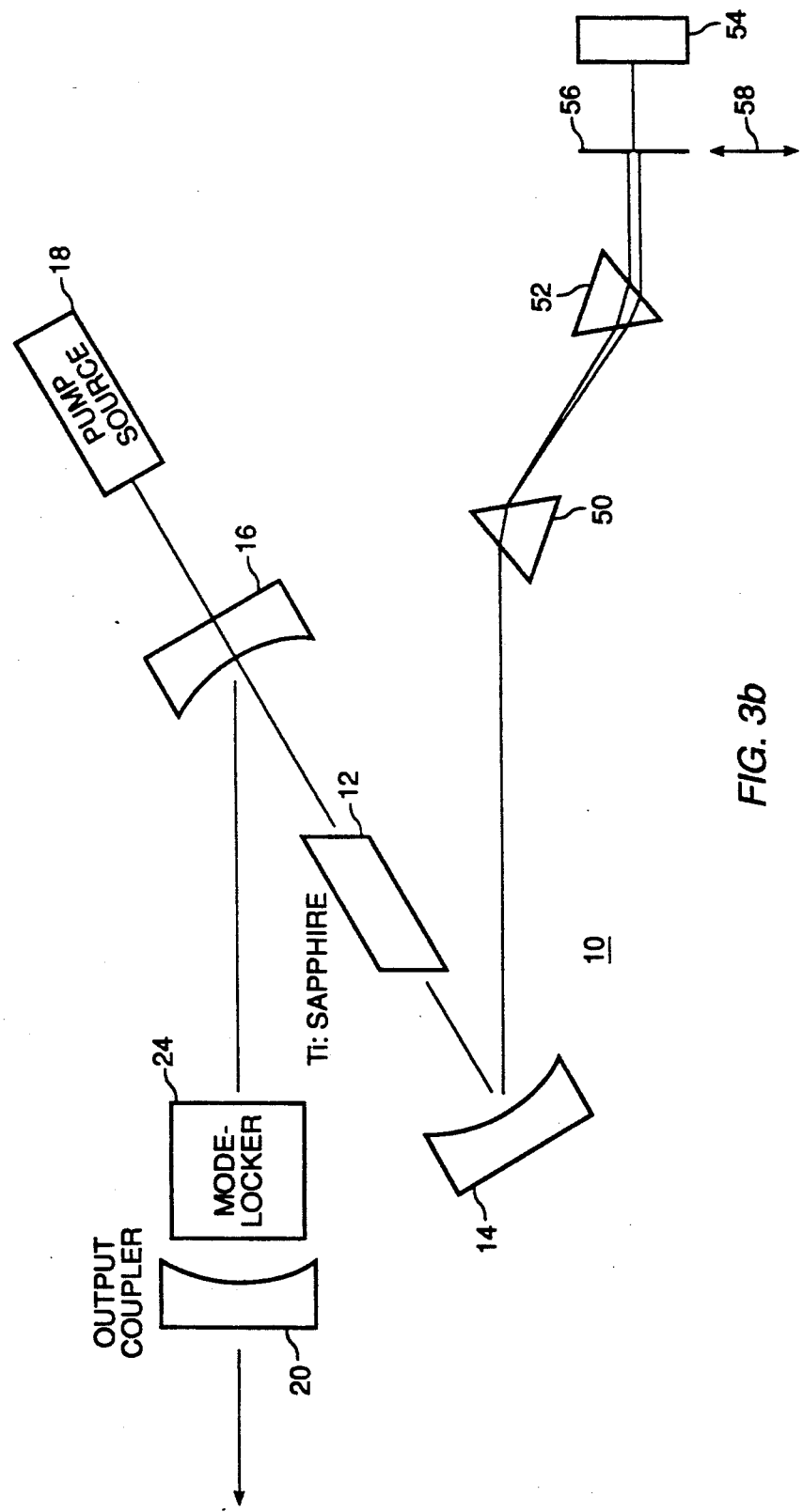
FIG. 3b is a diagram showing the elements of a second alternate embodiment of a laser according to the present invention and their structural relationship to one another.

In an alternate embodiment, shown in FIG. 3b, a slit 56 is placed between the second prism 52 and a flat end mirror 54 to replace the birefringent filter. In this embodiment, the laser may be tuned by translating the slit 56 along an axis perpendicular to the beam path and in the plane of the figure as indicated by the arrow at reference numeral 58.

Figure 3C:
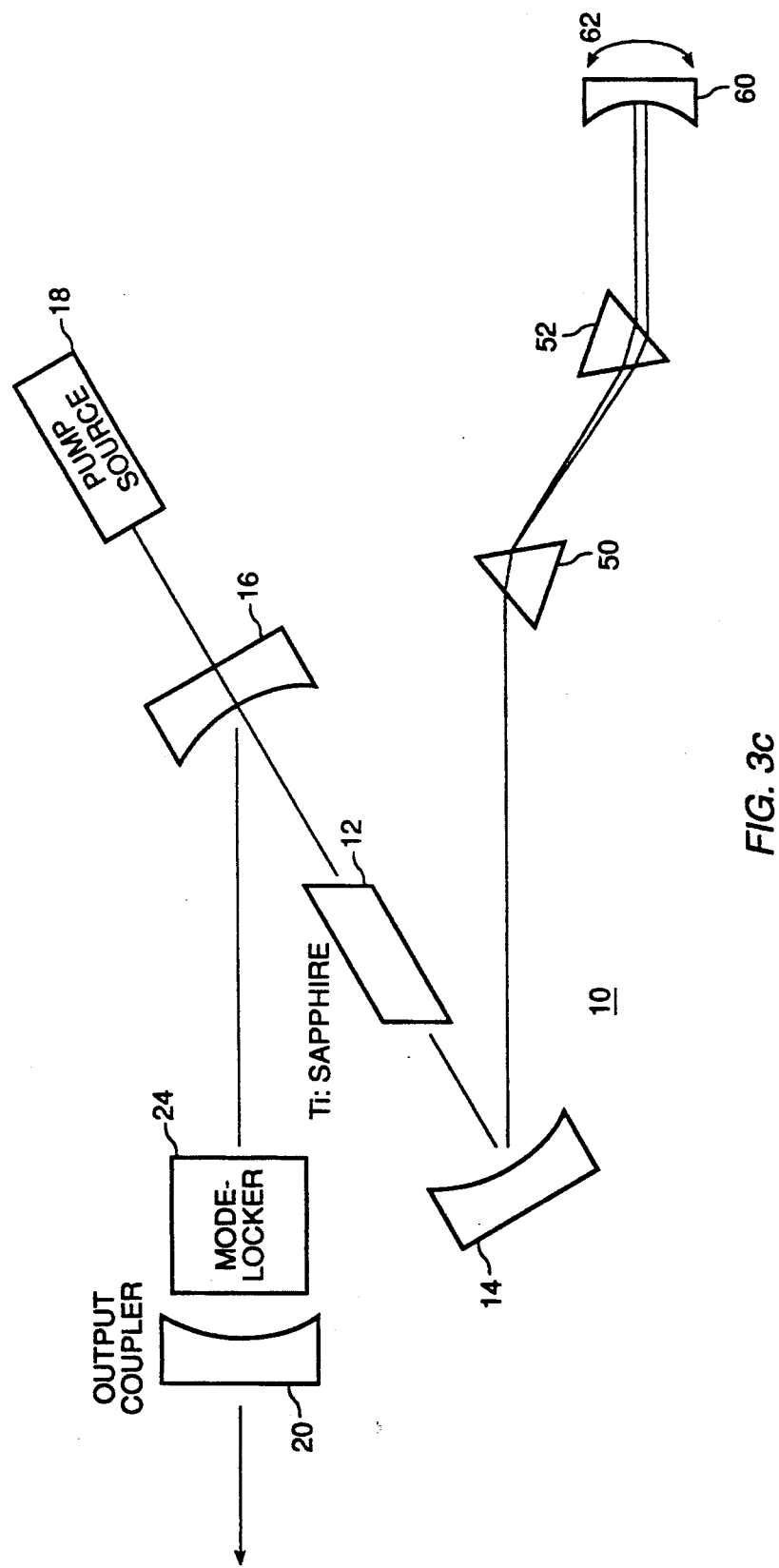
FIG. 3c is a diagram showing the elements of a third alternate embodiment of a laser according to the present invention and their structural relationship to one another.

In a third embodiment, shown in FIG. 3c, the combination of the slit 56 and flat end mirror 54 may be replaced by a curved end mirror 60. In this embodiment, the laser may be tuned by tilting the curved end mirror 60 about an axis perpendicular to the beam and perpendicular to the plane of the figure as indicated by the arrow at reference numeral 62.

Active mode locking at pulse widths under 10 psec is difficult since the laser becomes very sensitive to matching the round trip time of a pulse in the laser cavity to the period of the amplitude modulation used to modelock the laser. Closed loop mode locking is used in a preferred embodiment of the present invention to reduce sensitivity to cavity fluctuations.

Figure 4:
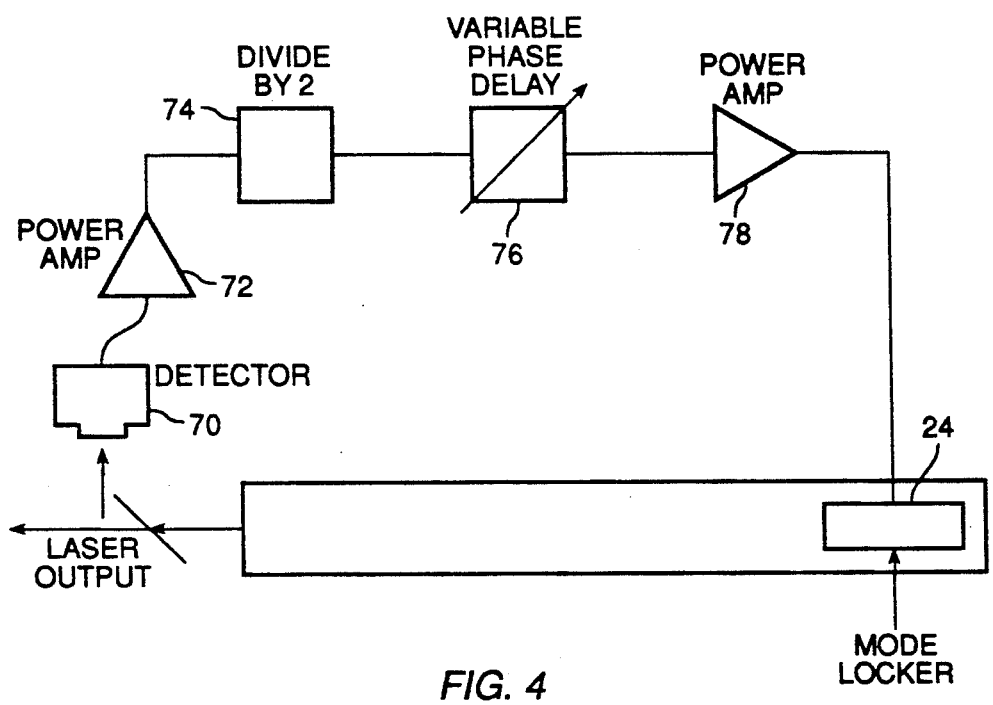
FIG. 4 is a schematic block diagram of a closed loop electronic circuit used to initiate mode locking in the laser of FIG. 1 in a presently preferred embodiment of the invention.

As shown in FIG. 4, the presently preferred technique for stabilizing the dispersion compensated laser of the present invention is to detect the beat frequency between adjacent longitudinal modes. A photodetector, preferably a high speed photodiode 70 detects the beat frequency between adjacent longitudinal modes. The signal from photodiode 70 is amplified in amplifier 72, which may be a model 603L available from ENI in Rochester, N.Y. The frequency of the signal is halved in divide by two circuit 74, which may be a 10016 divide by N integrated circuit available from Fairchild of Mountainview Calif., or equivalent. The signal is passed through an electronically adjustable phase shifter 76, which may be a model PEW 360 available from Mermimac, Inc. of West Caldwell, N.J. or equivalent. The signal is then amplified by power amplifier 78. The phase shifter is adjusted to provide the optimal time delay for the modulation signal applied to the mode locker 24. The phase is adjusted to provide short, stable pulses from the oscillator. This signal is applied to the acousto-optic modelocker 24.

If the cavity length drifts the beat frequency between the longitudinal modes changes, the rf signal applied to the modulator changes in exactly the right manner to track the drift in cavity length. Thus the modelocker 24 is automatically synched to the round trip of the laser cavity.

This closed loop technique provides distinct advantages over the usual technique of driving the modelocker directly with an external RF source. First, the stability of the laser is greatly improved by having the mode-locker automatically synched to the cavity. If an external RF source is used and the cavity round trip time, which depends on the cavity length, becomes mismatched, the laser will exhibit fluctuations amplitude approaching 100%. In addition the pulse width will also fluctuate. The mismatch which can be tolerated is a function of the pulse width but is on the order of a 5 micron cavity length change per a 1.8 meter cavity and a 5 picosecond pulse. With the mode-locker synched to the cavity, the cavity length can be varied several millimeters with no substantial change in the pulse amplitudes or pulse width.

Secondly, since the mismatch that can be tolerated between the mode-locker drive frequency and the cavity round trip time becomes smaller as the pulse becomes shorter, the stability of the cavity puts a lower limit on the pulse width that can be generated. The inventors have found that stable 5 picosecond pulses can be generated using an external RF source to drive the mode-locker but that 2 picosecond pulses will not be stable due to small changes in the cavity length. When the closed loop electronics from FIG. 4 are used and the mode-locker automatically tracks the cavity length changes, pulses as short as 1.1 picosecond have been generated with no loss of stability.

As will be appreciated by those of ordinary skill in the art, one consequence of the use of this technique which may be a disadvantage in some applications is that the laser is not stable with respect to any external reference clock. If long term stability is desired, the longitudinal mode beat frequency can be phase locked to a stable external clock using standard phaselocking techniques. The phase locking method would use a piezoelectric crystal, or other suitable length transducer, to adjust the laser mirror separations so as to phase lock the cavity round trip time to an external reference.

In other laser systems known to the inventors, the synthesizer is tied to the mode locker and the cavity is allowed to drift in length. The actively mode locked laser system described herein uses a different clock than is used in presently known systems. In the present system, the cavity is tied to the mode locker and is then phase locked to a synthesizer. The advantages of the present scheme include the ability to obtain shorter pulses and improved stability as a result of tying the mode locker, cavity and synthesizer together in this manner.

Figure 5:
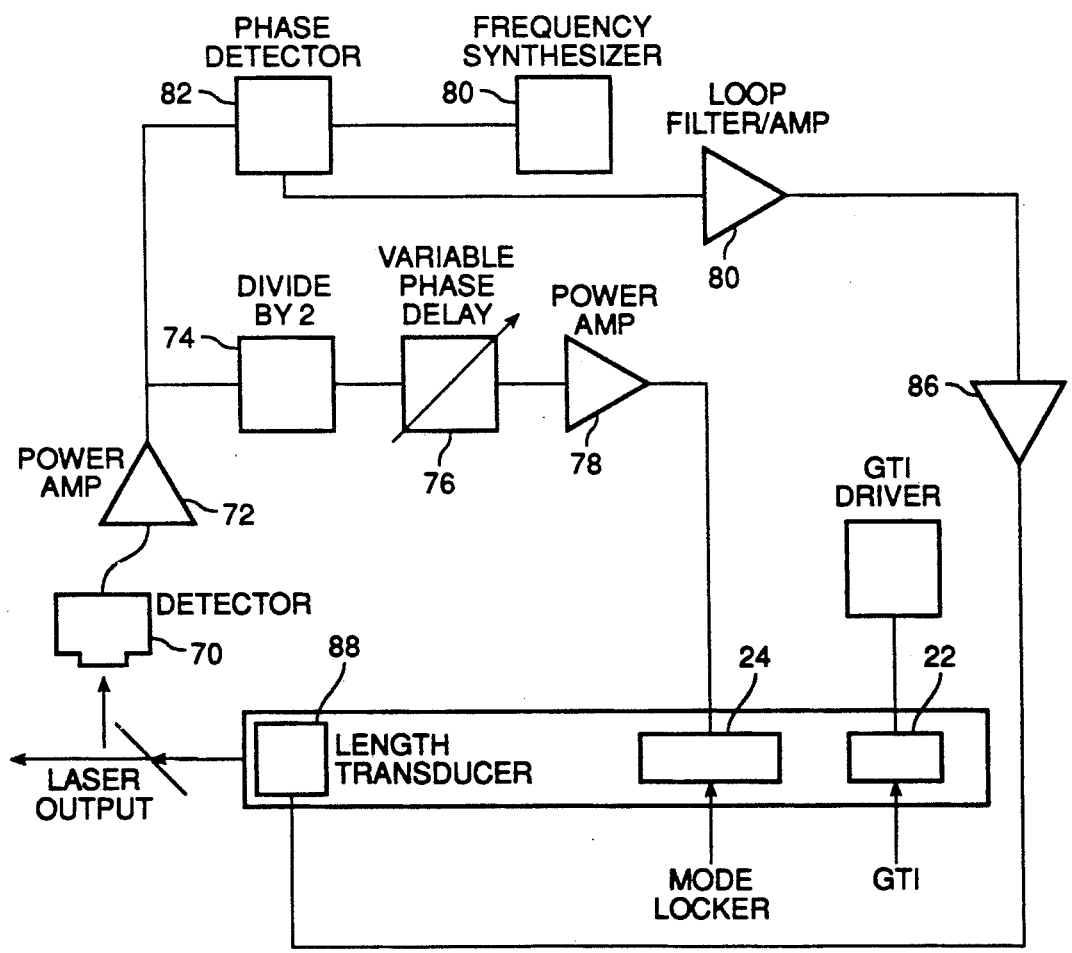
FIG. 5 is a schematic block diagram of a closed loop phase locked electronic circuit used to initiate mode locking and stabilize the laser of FIG. 1 in a presently preferred embodiment of the invention.

Referring now to FIG. 5, a block diagram of the dispersion compensated laser of the present invention is shown with a phase locked, closed loop control system. As can be seen from FIG. 5, the stabilizing circuitry used in FIG. 4 is present. In addition, the amplified signal from detector 70 and amplifier 72, and a reference clock signal from reference clock 80 are compared with each other in phase detector 82. Reference clock 80 may be any clock circuit capable of producing a clock signal, preferably a sine wave, at the frequency of interest.

The output of phase detector 82 is amplified in loop filter/amplifier 84. The output of loop filter amplifier 84 drives a high voltage driver 86, which may be a Spectra physics 476 interferometer driver whose output is used to drive length transducer 88, which may be a model P-178.10, manufactured by Physik Instrumente, of Waldbronn, West Germany available from Poly Tec Optronics, Costa Mesa, Calif.

As an example of an embodiment of the present invention, a Ti:Sapphire laser system having a 80 micron air space GTI with a 4% reflector and a 100% reflector, a one plate birefringent filter, and a 15% output coupler was pumped with an all lines argon ion laser at 8 watts pump power. The mode locker is driven by the closed loop circuit disclosed in FIG. 4. The observed output at 780 nanometers was 1.5 watts at a pulse width of 1.3 picoseconds at a repetition rate of 82 MHz.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A tuneable mode-locked laser including a Gires-Tournois interferometer for dispersion compensation, said Gires-Tournois interferometer comprising:

a substrate having a highly-reflective surface thereon;

a partially-reflective surface orientated substantially parallel to and spaced at a distance from said highly-reflective surface;

a piezoelectric transducer mounted so as to render moveable at least one of said partially-reflective and highly-reflective surfaces to vary the spacing therebetween.

2. The tuneable mode-locked laser of claim 1 wherein said Gires-Tournois interferometer is disposed in a laser cavity of said laser, and wherein said laser cavity and said Gires-Tournois interferometer configured such that the laser beam path intersects said Gires-Tournois interferometer more than once per cavity round trip.

3. A tuneable mode-locked laser including a Gires-Tournois interferometer for dispersion compensation, said Gires-Tournois interferometer comprising:

a substrate having a highly-reflective surface thereon;

a partially-reflective surface spaced at a distance from said highly-reflective surface, said partially-reflective surface oriented with respect to said and highly-reflective surface such that the spacing between said partially-reflective and highly-reflective surfaces varies across their surface by about one wavelength; and means for translating said Gires-Tournois interferometer across the beam path of said laser in order to obtain a desired spacing between said partially-reflective and highly-reflective surfaces in said beam path.

4. The tuneable mode-locked laser of claim 3 wherein said Gires-Tournois interferometer is disposed in a laser cavity of said laser, and wherein said laser cavity and said Gires-Tournois interferometer configured such that the laser beam path intersects said Gires-Tournois interferometer more than once per cavity round trip.

5. A tuneable mode-locked laser including a Gires-Tournois interferometer for dispersion compensation, said Gires-Tournois interferometer comprising:

a substrate having a highly reflective coating on one face thereof and an optically transmissive dielectric spacer deposited over said highly-reflective coating, and further including a partially-reflective coating deposited over said dielectric spacer, said dielectric spacer being wedge shaped in cross section such that the spacing between said partially-reflective and highly-reflective coatings varies across their length by about one wavelength; and means for selectively positioning a desired cross-sectional thickness of said Gires-Tournois interferometer in the beam path of said laser.

6. The tuneable mode-locked laser of claim 5 wherein said Gires-Tournois interferometer is disposed in a laser cavity of said laser, and wherein said laser cavity and said Gires-Tournois interferometer configured such that the laser beam path intersects said Gires-Tournois interferometer more than once per cavity round trip.

* * * * *